United States Patent [19]

Namiguchi

[11] 4,138,911
[45] Feb. 13, 1979

[54] CUTTING TOOL

[75] Inventor: Yasuteru Namiguchi, Yao, Japan

[73] Assignee: Toho Koki Kabushiki Kaisha, Osaka, Japan

[21] Appl. No.: 856,600

[22] Filed: Dec. 1, 1977

[30] Foreign Application Priority Data

Jan. 19, 1977 [JP] Japan .................. 52-005566

[51] Int. Cl.² ................. B23B 3/04; B23B 5/14
[52] U.S. Cl. ............................. 82/72; 82/59; 82/84; 82/101
[58] Field of Search ............... 82/72, 59, 75, 76, 77, 82/78, 79, 81, 83, 84, 99, 101, 70.1, 70.2, 4 C

[56] References Cited

U.S. PATENT DOCUMENTS

| | | | |
|---|---|---|---|
| 826,434 | 7/1906 | Lally | 82/83 |
| 1,001,126 | 8/1911 | Dawson | 82/76 |
| 1,468,935 | 9/1923 | Vasper | 82/101 |
| 3,807,047 | 4/1974 | Sherer et al. | 82/72 |
| 4,072,073 | 2/1978 | Birkestrand | 82/101 |

*Primary Examiner*—Harrison L. Hinson
*Attorney, Agent, or Firm*—Koda and Androlia

[57] ABSTRACT

A tool for cutting tubular or solid cylindrical workpieces such as rigid polyvinyl chloride or like rigid resin pipes, soft metal pipes, etc. transversely thereof comprises a main body having a bearing portion including a pair of freely rotatable members, a vertically movable cutter arm pivoted to the main body and provided with a pair of rotary cutters opposed to the rotatable members in corresponding relation thereto, a cutter arm lifting assembly for moving the rotary cutters toward or away from the rotatable members, and an intermittent feeder mounted on the cutter arm for rotating the rotary cutters in the same direction. The workpiece is placed on the bearing portion of the main body and set in position substantially at right angles to the rotary cutters. After the edge of one of the rotary cutters has been brought into contact with the workpiece, the cutter arm lifting assembly is operated to hold the workpiece between the bearing portion and the rotary cutter. A handle, when operated, delivers torque to the pair of rotary cutters through the intermittent feeder, rotating the workpiece more than one turn about its own axis, whereby an incision is pre-formed in the workpiece by one of the cutters. The arm lifting assembly and the handle are thereafter repeatedly operated, causing the rotary cutters to cut the workpiece transversely thereof while rotating the workpiece about its axis.

7 Claims, 7 Drawing Figures

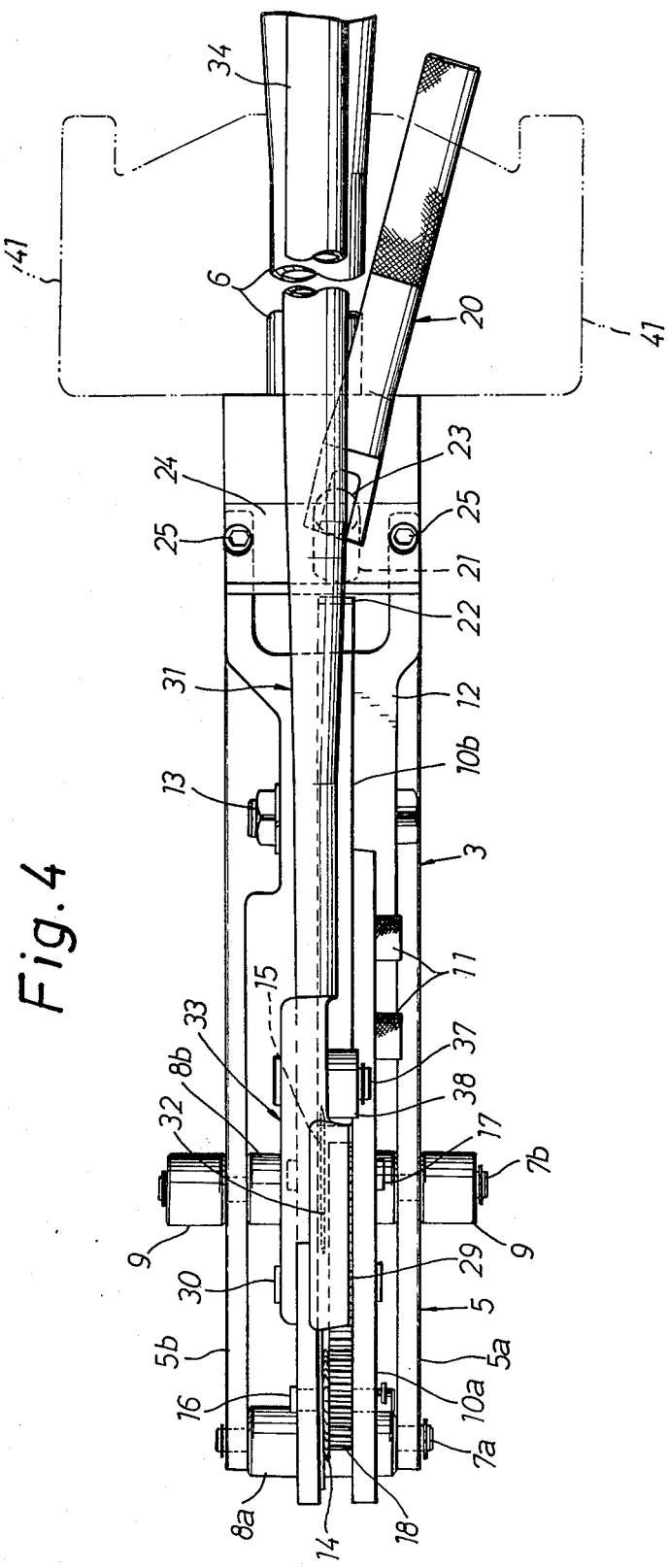

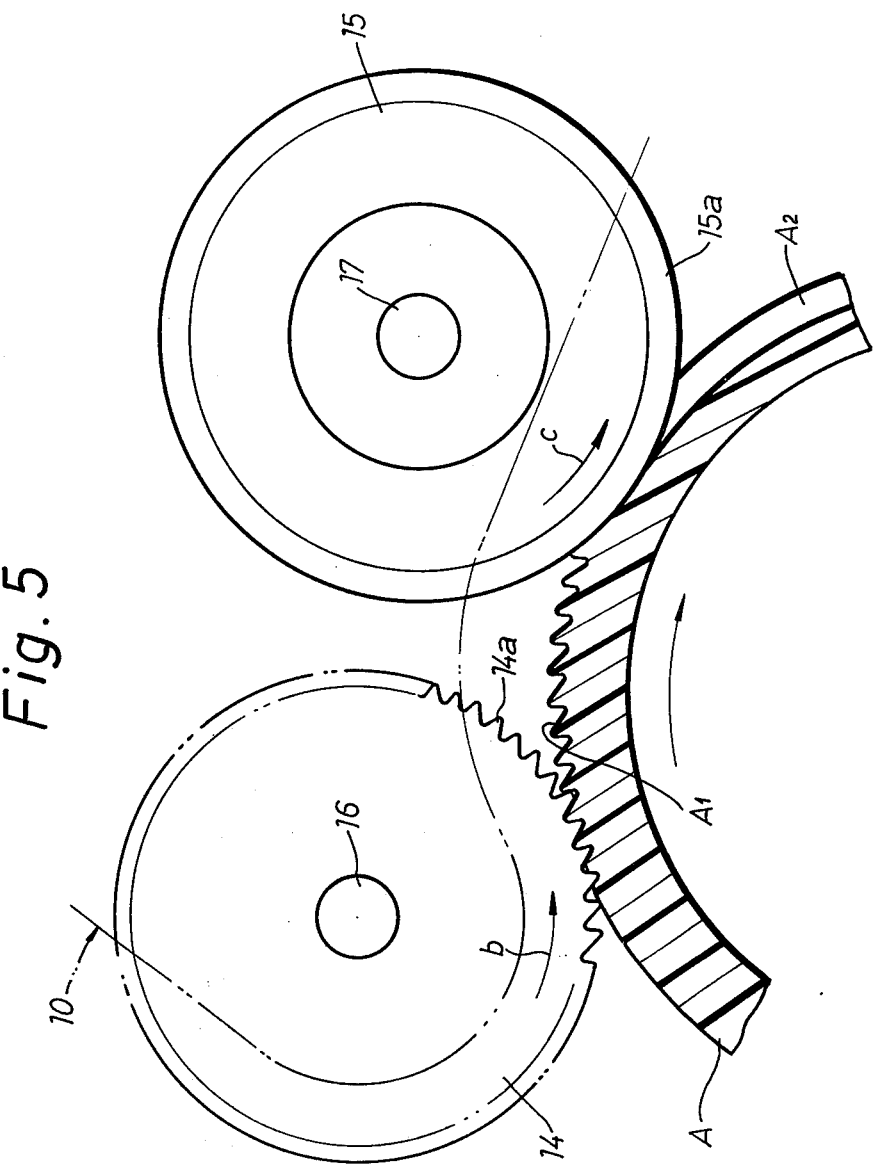

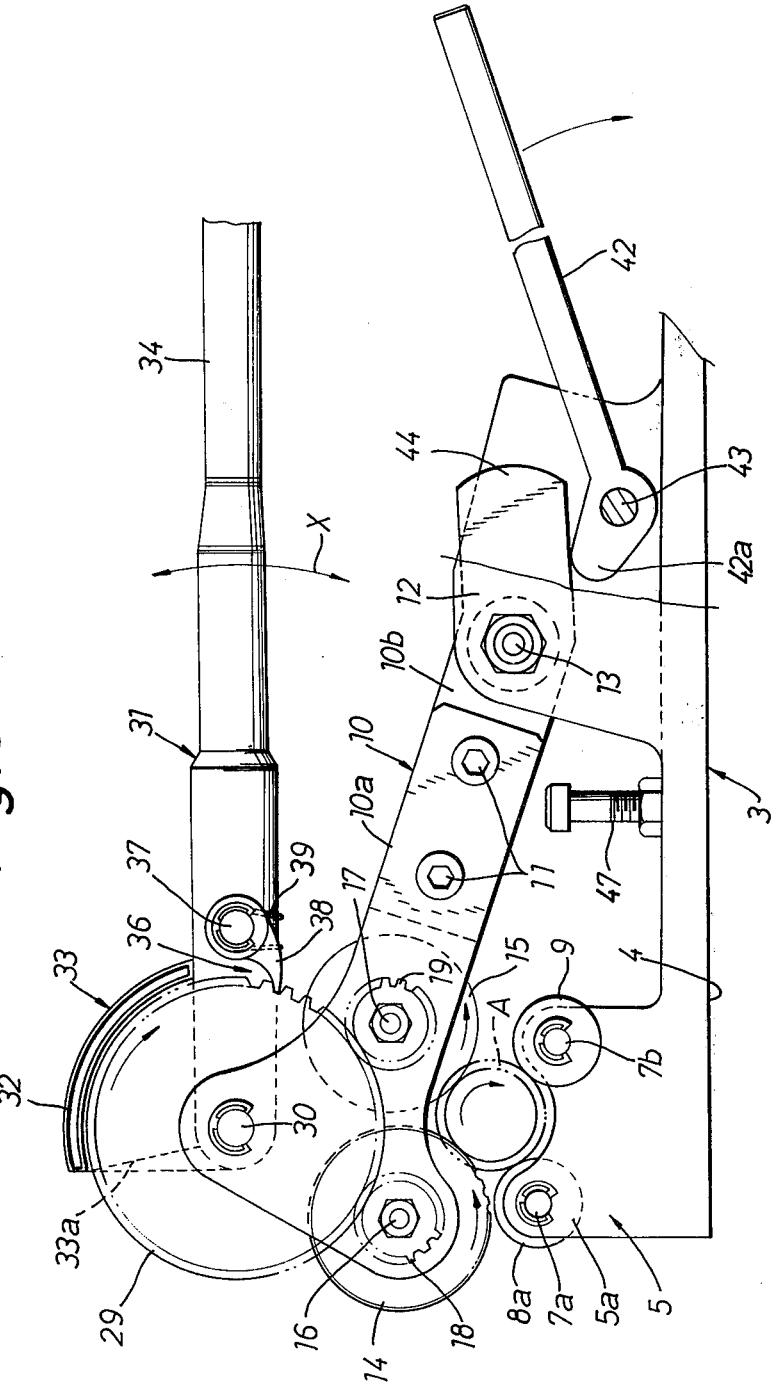

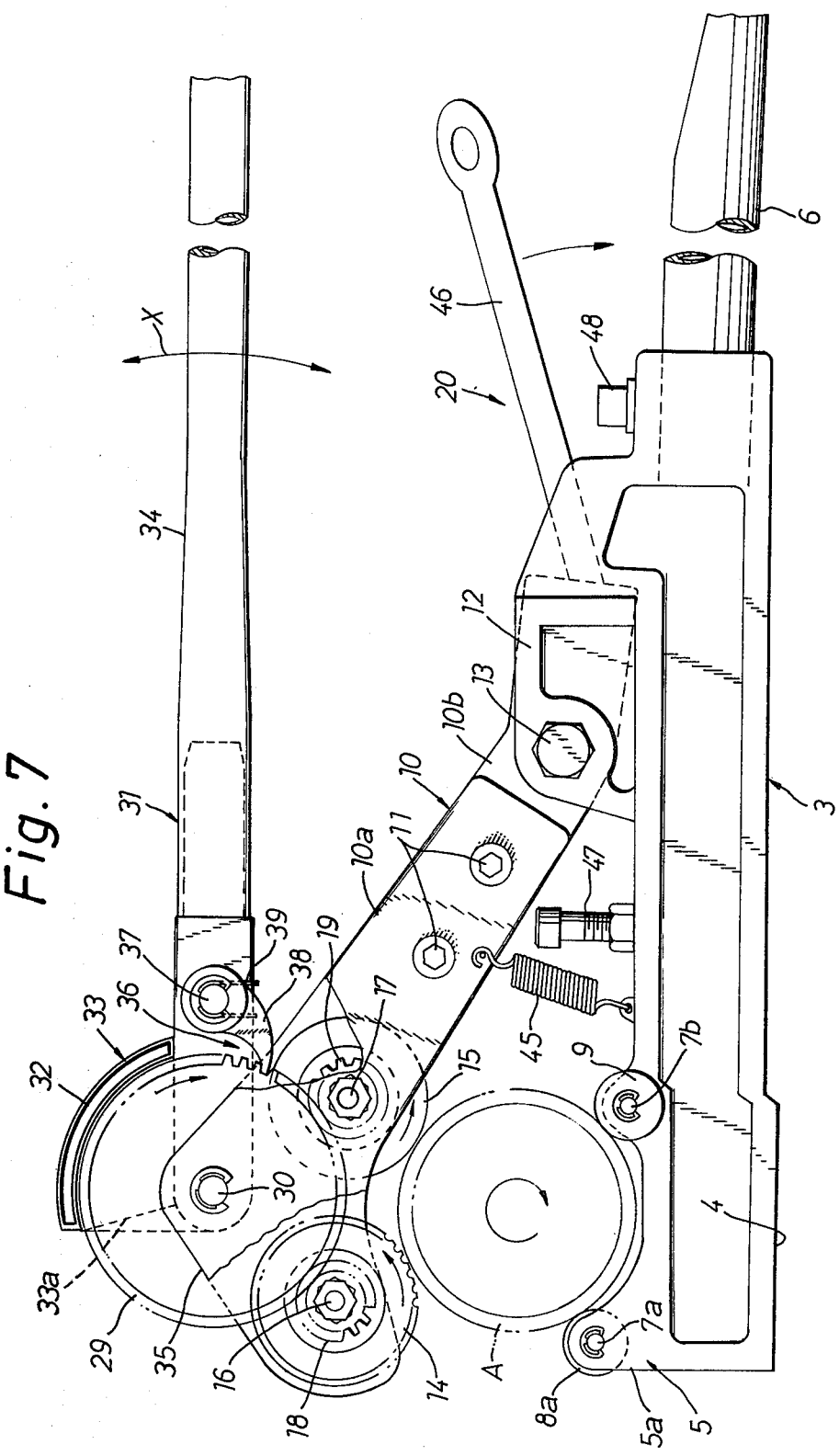

CUTTING TOOL

BACKGROUND OF THE INVENTION

This invention relates to a cutting tool for tubular or solid cylindrical bodies having a circular outer periphery such as rigid polyvinyl chloride pipes and other synthetic resin pipes, and more particularly to a portable cutting tool for cutting a workpiece transversely thereof while rotating the workpiece about its axis.

When cutting an elongated workpiece of whatever configuration and whatever material such as synthetic resin, metal or wood to a predetermined length transversely thereof, it is usual practice to hold the workpiece in position against rotation about its axis and cut the workpiece with a rotatable or stationary cutter by operating the cutter by its handle.

When coming into contact with the workpiece, the cutter causes flexural deformation to the workpiece, producing compression on one side of the workpiece and tension on the other side thereof. The compressed side must be cut with a very great cutting force, whereas the tensioned side can be cut with a relatively small force but will undergo cracking, giving an irregular cut end surface.

Portable cutting tools are used for cutting rigid polyvinyl chloride pipes, copper pipes or aluminum pipes for the construction of water supply piping systems. Since the cutting tool is manually operated, it is undesirable for the tool to require a great cutting force as described above. Because pipes must be cut with high precision for piping systems, cracks, if any in the cut end, would be objectionable. In fact, difficulties have been encountered with such a cutting tool in ensuring a smooth, easy and accurate cutting operation.

Moreover, tubular or solid cylindrical workpieces vary greatly in diameter, so that the adjusting device which is useful in holding any of such workpieces is complex in construction, and even with the use of the adjusting device, the workpiece is very cumbersome to set in position.

SUMMARY OF THE INVENTION

An object of this invention is to provide a cutting tool especially of the portable type for cutting tubular or solid cylindrical workpieces having a circular outer periphery while rotating the workpiece about its own axis, whereby the workpiece can be cut smoothly and easily with high accuracy without subjecting the workpiece to compression or tension over the entire circumferential periphery thereof.

Another object of this invention is to provide a portable cutting tool comprising a bearing portion including a pair of freely rotatable members and a pair of rotary cutters mounted on a vertically movable cutter arm which, when moved upward or downward, brings the pair of rotary cutters toward or away from the bearing portion, the cutting tool therefore being capable of cutting workpieces of varying diameters.

Another object of this invention is to provide a portable cutting tool of the construction described above in which one of the pair of rotary cutters is saw-toothed and the other cutter is smooth-edged, such that when the cutters are driven in the same direction, the saw-toothed cutter first forms an intermittent incision in the workpiece, permitting the smooth-edged cutter to thereafter cut the workpiece along the incision so as to give a neat cut end free of any cracking.

Another object of this invention is to provide a portable cutting tool which is adapted to rotate the workpiece about its axis to thereby render the handle of the tool movable only through a greatly reduced angle of operation, whereby the tool is made easily portable and usable even when only a limited space is available at the site of cutting operation.

Still another object of this invention is to provide a portable cutting tool which is simple in construction and operable with a relatively small manual force without causing damage to the workpiece.

Other objects, features and advantages of this invention will become apparent from the following detailed description of the preferred embodiments.

BRIEF DESCRIPTION OF THE DRAWINGS

FIG. 4 is a plan view of FIG. 3;

FIG. 5 is a detailed view in section illustrating the cutting operation;

FIG. 6 is a fragmentary side elevation showing another embodiment; and

FIG. 7 is a fragmentary side elevation showing still another embodiment.

DESCRIPTION OF THE PREFERRED EMBODIMENTS

Figure 1:
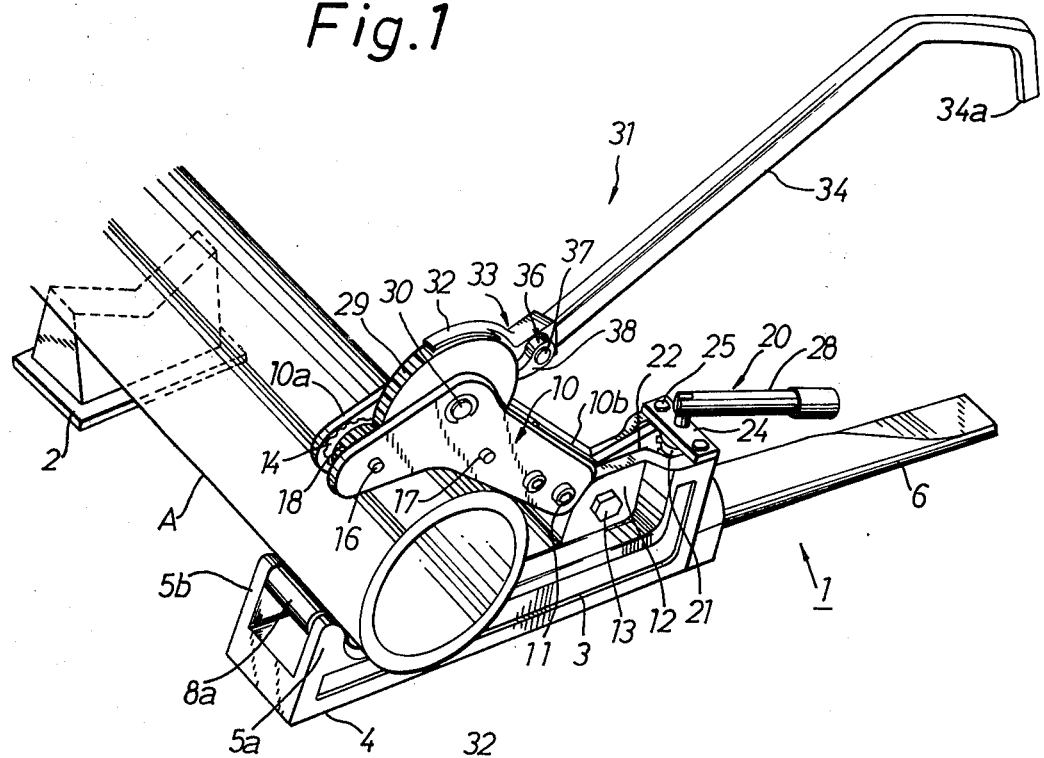
FIG. 1 is a perspective view showing a preferred embodiment of this invention in its entirety with a workpiece set in position.
Figure 2:
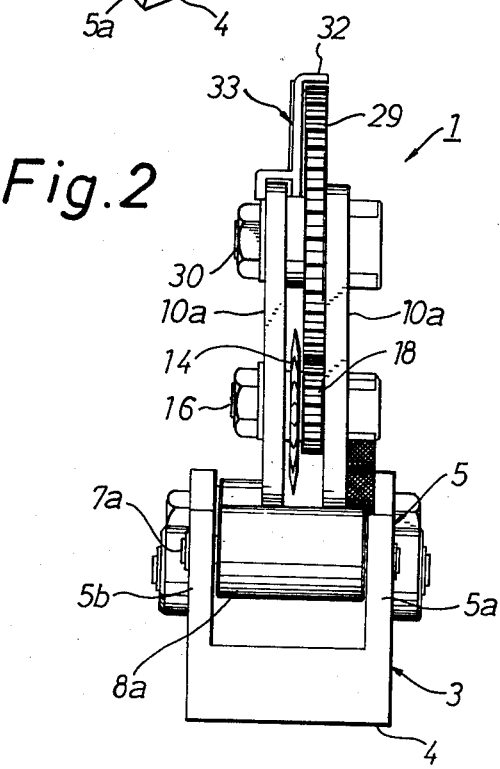
FIG. 2 is a front view of the embodiment.

With reference to FIGS. 1 to 4, a portable cutting tool 1 is used with a support 2 shown in FIG. 1 when the workpiece A has a great length. A base main body 3 has a flat bottom 4 for installation and a bearing block 5 projecting from its head. The main body 3 is provided with a pipe secured to its rear end opposite to the head and extending rearward. The rear extension of the pipe is flattened to a progressively reduced thickness toward its rear end, providing a pipe plate 6.

The bearing block 5 is composed of opposed walls 5a, 5b formed by substantially projecting the opposite side walls of the main body 3. A pair of support pins 7a, 7b spaced apart by a suitable distance are supported by and extend between the opposed walls 5a, 5b. Freely rotatable members 8a, 8b are mounted on the support pins 7a, 7b respectively.

Figure 3:
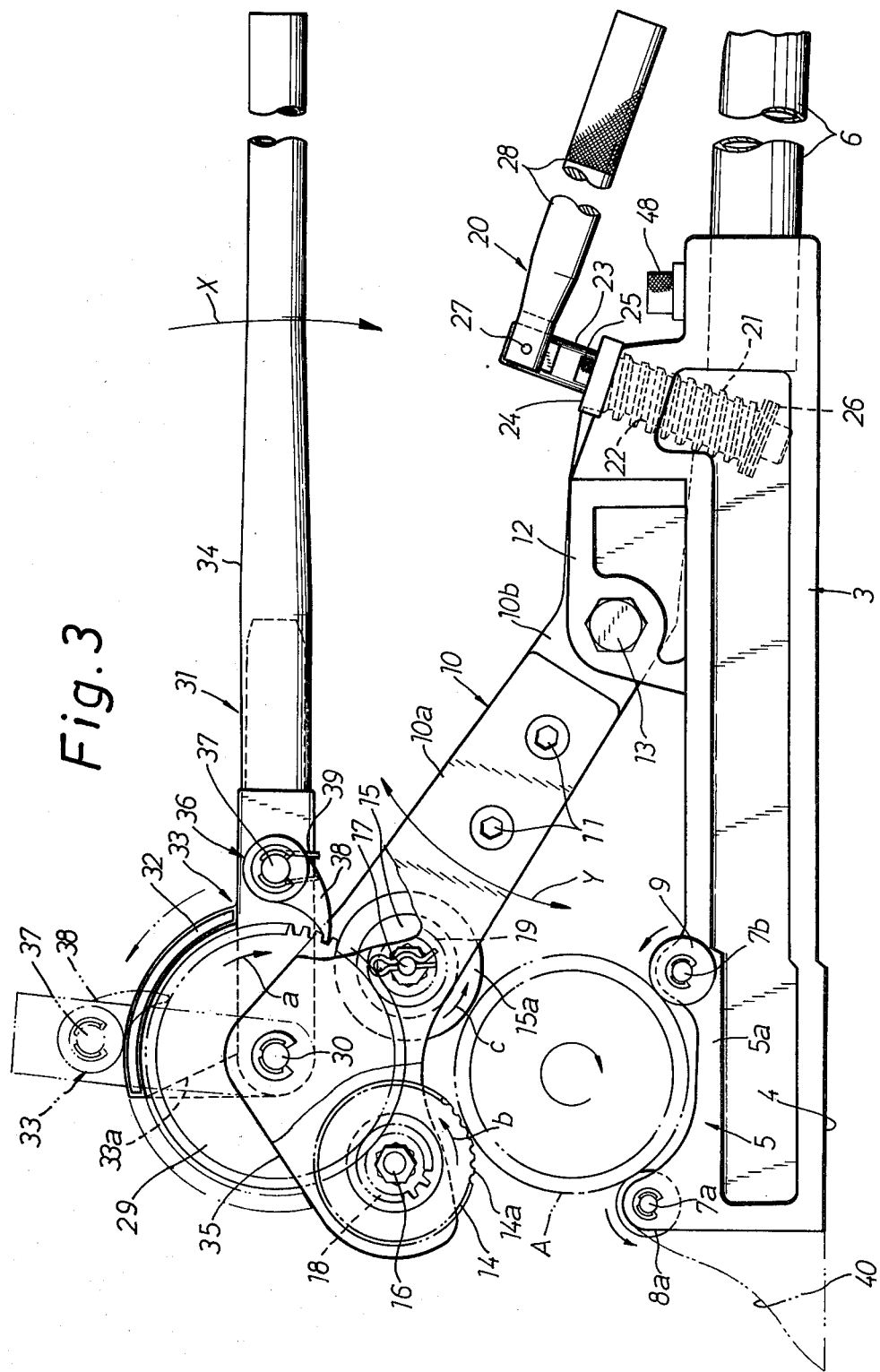
FIG. 3 is a fragmentary enlarged side elevation of FIG. 2 partly cut away.

As seen in FIG. 3, the freely rotatable members 8a, 8b are positioned at different levels. In the illustrated embodiment, the rotatable member 8a is positioned at a higher level than the rotatable member 8b. The workpiece A, which is a rigid polyvinyl chloride pipe in the illustrated embodiment, is placed between the pair of the rotatable members 8a and 8b which are supported by the pins 7a, 7b and positioned substantially between the opposed walls 5a, 5b. To render the pipe A supportable with good stability, the pin 7b for the rotatable member 8b extends outward from the opposed walls 5a, 5b, with a pair of auxiliary rotatably members 9 freely rotatably mounted on the pin extensions. The freely rotatable members, which are smoothsurfaced metal rollers, may alternatively be made of a rigid resin such as nylon-6.

A cutter arm 10 is composed of a first arm 10a which is bifurcated and a second arm 10b in the form of a bell crank. The second arm 10b is inserted into and gripped by the first arm 10a and is fastened thereto by bolts 11.

When the arms 10a, 10b are thus fastened together, the first arm 10a extends upward with its head portion opposed to the head portion of the main body 3.

The base main body 3 is provided with a cutter arm mounting bracket 12 which is substantially in the form of a pair of projectnng walls. The cutter arm 10 is disposed between the bracket walls 12 and pivoted thereto by a bolt 13, which extends substantially transversely of the main body and supports the bent portion of the second arm 10b.

A first rotary cutter 14 and a second rotary cutter 15 are mounted on shafts 16, 17 on the head portion of the cutter arm 10. The first and second rotary cutters 14, 15 are opposed to the rotatable members 8a, 8b on the bearing block 5 of the main body substantially in corresponding relation thereto. The first rotary cutter 14 has a saw-toothed edge 14a, while the second rotary cutter 15 is smooth-edged as at 15a. The cutters 14, 15 are provided, each on one side thereof, with driven gears 18, 19 integral therewith. The assembly including the cutter 14, gear 18, cutter 15 and gear 19 is disposed between the bifurcated portions of the first arm 10a.

Indicated at 20 is arm lifting means, which in the first embodiment is a force amplifying assembly comprising a worm 21 and a rack 22. The rack 22 is substantially in the form of a sector gear formed at the rear end of the cutter arm 10. A worm shaft 23 carrying the worm 21 meshing with the rack 22 extends in a slanting position between the bracket walls 12 and is rotatable about its axis. As shown in FIGS. 3 and 4, a worm plate 24 extends between the bracket walls 12 and is fastened thereto by bolts 25. The worm shaft 23 extends loosely through the plate 24 and has its lower end supported by a thrust bearing 26 composed of dish springs. A tiltable handle 28 pivoted as at 27 to the worm shaft 23 is turnable about the axis of the worm shaft 23, whereby the cutter arm 10 is movable upward or downward about the bolt 13 by virtue of the meshing engagement between the worm 21 and the rack 22 as indicated by the arrow Y in FIG. 3.

A drive gear 29 is rotatably supported by a shaft 30 on the first arm 10a of the cutter arm 10. The drive gear 29 is positioned above the drive gears 18 and 19 in meshing engagement therewith. The shaft 30 for the gear 29 also supports cutting force applying means 31, which comprises a handle block 33 having a guard 32 and a handle bar 34 fixedly fitted to the block 33. As seen in FIGS. 1, 3 and 4, the handle bar 34 is positioned above and coextensive with the pipe plate 6 of the main body 3. To ensure good operability and portability, the rear end of the bar 34 is bent toward the pipe plate 6.

The guard 32 for the handle block 33 covers part of the outer periphery of the drive gear 29 and is bulged sidewise. The cutting force applying means 31 is turnable about the shaft 30 through about 90° as indicated by the arrow X in FIG. 3 from the position in which a stopper 33a formed on the block 33 is in contact with the top face 35 of the cutter arm 10 and to the position in which the end face 34a of the handle bar 34 is in contact with the floor.

Intermittent feeding means 36 comprises a ratchet 38 supported by a pin 37 on the handle block 33 and engaging the drive gear 29. A spring 39 on the block 33 biases the ratchet 38 into engagement with the gear 29.

The cutting force applying means 31 of the handle type, when pushed downward about the shaft 30, causes the ratchet 38 to rotate the drive gear 29 in a clockwise direction in FIG. 3 as indicated by the arrow a in FIG. 3. The drive gear 29 meshing with the driven gears 18, 19 therefore rotates the pair of rotary cutters 14, 15 in the same direction, namely counterclockwise as indicated by the arrow b. The means 31 is returned and thereafter pushed down again, and this movement is of course repeated.

FIG. 3 shows a pipe guide 40 having a curved face and attached to the head portion of the main body 3. The pipe guide 40 renders the workpiece 40 easily settable in position and removable therefrom but can be omitted.

When desired, the main body 3 may be provided with a step 41 shown in FIG. 4 and extending outward from the opposite sides of the body 3. This enables the user to cut the workpiece in a greatly stabilized position.

FIG. 6 shows another embodiment of this invention in which the arm lifting means 20 is a force amplifying assembly of different construction comprising a cam lever 42 turnably mounted on a pin 43 and having a pusher cam 42a and a driven cam 44 formed on the cutter arm 10. The pusher cam 42a may be so profiled as to give a progressively increasing biting force, whereby the amount of the movement of the cutting force applying means 31 required for cutting can be adjusted relative to the resistance resulting from the cutting operation to ensure improved efficiency.

FIG. 7 shows another embodiment in which at least one spring 45 is attached to and extends between the head of the cutter arm 10 and the main body to pull the arm. This spring-type construction is advantageous in that the cutter arm 10 can be automatically forced toward the biting direction, thus eliminating the necessity for the user to lower the arm 10. With the embodiment shown in FIG. 7, the arm 10 is provided with a release lever 46 for setting the workpiece A in position.

The embodiments of FIGS. 6 and 7 are further provided with a stopper 47 projecting from the main body 3 by an adjustable amount. The stopper 47 prevents the contact of the cutters 14, 15 with the rotatable members 8a, 8b after the completion of cutting by the contact of the stopper head with the arm 10. When desired, the first embodiment may be provided with such a stopper 47. Alternatively, the stopper 47 may be mounted on the arm 10.

Throughout the embodiments shown in FIGS. 1 to 7, like parts are referred to by like reference numerals.

FIG. 3 shows a bolt 48 for attaching a chain (not shown) which is engageable with the handle bar 34 to render the cutting tool convenient to carry.

With reference to FIGS. 1, 3 and 5, the cutting operation will be described below in the case where the workpiece A is a tubular body.

The arm lifting means 20 is operated to space the pair of rotary cutters 14, 15 away from the pair of rotatable members 8a, 8b by such a distance that the workpiece A can be placed on the tool. The workpiece A is placed on the rotatable members 8a, 8b, with the use of the support 2 if it is an elongated piece. After the first rotary cutter 14 has been brought into contact with the workpiece A as illustrated in FIG. 3, the arm lifting means 20 is further moved in the biting direction, thereby causing the saw-toothed edge 14a of the first cutter 14 to bite into the workpiece A and hold the workpiece A in cooperation with the rotatable members 8a, 8b.

The cutting force applying means 31 is raised to the broken-line position in FIG. 3 and then the handle 34 thereof is pushed down, causing the intermittent feeding means 36 comprising the ratchet 38 to rotate the drive gear 29 in the specified direction a. The gear 29, which is in meshing engagement with the driven gears 18, 19 integral with the first and second rotary cutters 14, 15, rotates both the cutters 14, 15 in the same direction b, c. At this time, the second rotary cutter 15 is still out of contact with the workpiece A, with the first rotary cutter 14 alone in contact therewith. Accordingly, the first rotary cutter 14 forms a discontinuous incision in the workpiece A with its saw-toothed edge 14a. Since the saw-toothed edge 14a of the first rotary cutter 14 is in contact with the workpiece A supported on the pair of rotatable members 8a, 8b, the workpiece A is rotated about its axis on the rotatable members 8a, 8b. By raising and lowering the cutting force applying means 31 and thereby rotating the workpiece A at least one turn, the saw-toothed edge 14a forms an intermittent incision in the workpiece A. The incision indicates the portion of the workpiece to be cut.

After the preparatory procedure described above, the handle 28 of the cutter arm lifting means 20 is turned about the worm shaft 23 in the fastening direction, causing the cutter arm 10 to turn pivotally about the bolt 13 by virtue of the cooperation of the rack 22 and the worm 21 and thereby forcing the first and second rotary cutters 14, 15 to hold the workpiece against the pair of rotatable members 8a, 8b. As a result, both the saw-toothed edge 14a and the smooth edge 15a of the cutters bite into the incision. Since the cutter arm lifting means 20 has a force amplifying construction, the cutting edges can be effectively forced into the incision with a small operating force. The cutting force applying means 31, when subsequently raised and lowered, intermittently drives the gear 29 through the intermittent feeding means 36 in the form of a ratchet, causing the group of gears to rotate both the first and second rotary cutters 14, 15 in the same direction in the same manner as already described, with the result that the cutting edges 14a, 15a further advance into the incision. In this way, the saw-toothed edge 14a of the first rotary cutter 14 first forms a discrete incision as indicated at $A_1$ in FIG. 5 and the smooth-edge 15a of the second cutter 15 forms a continuous incision as indicated at $A_2$. The second rotary cutter 15 may be adapted to cut to the same depth as, or to a greater depth than, the preceding cutter 14. During the cutting operation, the handle 34 becomes operable with a reduced force upon every turn of the workiece A about its axis, so that the cutter arm lifting means 20 is further advanced in the fastening direction. By advancing the cutter arm lifting means 20 and raising and lowering the handle 34 repeatedly several times, the workpiece can be completely cut while being rotated about its own axis. After the completion of the cutting operation, the handle 34 is raised and the cutter arm lifting means 20 is operated in the releasing direction, whereby the cutter arm 10 is turned reversely about the bolt 13, moving the rotary cutters 14, 15 away from the rotatable members 8a, 8b.

The rotation of the workpiece A about its axis during the cutting operation eliminates to the greatest possible extent the flexural deformation of the workpiece A which would result from the cutting operation, thus giving a neat cut end face. Further the workpiece, even when slightly flexed, can be cut with a relatively small force since the portions opposed to the cutters 14, 15 are free of tension. Because the cutter arm 10 is pivotally moved, the position where the arm 10 holds the workpiece A gradually alters with the progress of the cutting operation. The arrangement in which the rotatable member 8a is positioned at a higher level than the rotatable member 8b serves to retain the workpiece A which would otherwise tend to disengage from these members when it is held thereagainst.

The portable cutting tool of this invention which ensures a smooth and accurate cutting operation is highly useful in cutting workpieces such as rigid polyvinyl chloride pipes for water supply systems, aluminum or copper pipes and solid cylindrical bodies of like materials, provided that they have a circular outer periphery.

What is claimed is:

1. A portable cutting tool comprising a base main body having a bearing portion including a pair of freely rotatable members, a vertically movable cutter arm provided with a pair of rotary cutters opposed to the rotatable members in corresponding relation thereto, cutter arm operating means for moving the rotary cutters on the cutter arm toward or away from the rotatable members, and cutting force applying means including intermittent feeding means for rotating both the rotary cutters in the same direction, so that the cutting force applying means when operated in a cutting direction causes the rotary cutters to progressively cut a workpiece placed on the rotatable members and held by the rotatable members and the rotary cutters while rotating the workpiece about its axis.

2. A portable cutting tool as defined in claim 1 wherein the cutter arm is pivotably supported at an intermediate portion thereof by the base main body, and the arm operating means is a force amplifying assembly composed of a worm and a rack.

3. A portable cutting tool as defined in claim 1 wherein one of the rotary cutters has a saw-toothed edge and the other rotary cutter is smooth-edge, the saw-toothed cutter being operative to form an incision in the workpiece first, the smooth-edge cutter being adapted to thereafter form a circumferentially continuous incision.

4. A portable cutting tool as defined in claim 1 wherein each of the rotary cutters is provided with a driven gear meshing with a drive gear, and the intermittent feeding means comprises a ratchet biased by a spring into engagement with the drive gear, the pair of rotary cutters being rotatable in the same direction by the operation of the cutting force applying means in the cutting direction through the group of gears including the drive gear.

5. A portable cutting tool as defined in claim 1 wherein the cutter arm is pivotably supported at an intermediate portion thereof by the base main body, and the arm operating means is a force amplifying assembly composed of a cam formed on the cutter arm and a cam having a cam lever.

6. A portable cutting tool as defined in claim 1 wherein the cutter arm is pivotably supported at an intermediate portion thereof by the base main body, and the arm operating means is a spring attached to and extending between the cutter arm and the base main body and pulling the arm.

7. A portable cutting tool as defined in claim 4 wherein the cutting force applying means is a handle pivoted to the cutter arm and coextensive with the base main body, the handle being partially provided with a guard covering part of the drive gear.

* * * * *